US009481292B2

(12) United States Patent
Faber et al.

(10) Patent No.: US 9,481,292 B2
(45) Date of Patent: Nov. 1, 2016

(54) METHOD AND CONTROL UNIT FOR INFLUENCING A LIGHTING SCENE AHEAD OF A VEHICLE

(75) Inventors: Petko Faber, Renningen (DE); Gregor Schwarzenberg, Calw (DE)

(73) Assignee: ROBERT BOSCH GMBH, Stuttgart (DE)

( * ) Notice: Subject to any disclaimer, the term of this patent is extended or adjusted under 35 U.S.C. 154(b) by 252 days.

(21) Appl. No.: 14/002,519

(22) PCT Filed: Feb. 24, 2012

(86) PCT No.: PCT/EP2012/053154
§ 371 (c)(1),
(2), (4) Date: Nov. 27, 2013

(87) PCT Pub. No.: WO2012/116931
PCT Pub. Date: Sep. 7, 2012

(65) Prior Publication Data
US 2014/0071702 A1 Mar. 13, 2014

(30) Foreign Application Priority Data

Mar. 2, 2011 (DE) .......................... 10 2011 004 937

(51) Int. Cl.
*B60Q 1/08* (2006.01)
*G06K 9/00* (2006.01)

(52) U.S. Cl.
CPC .................. *B60Q 1/08* (2013.01); *B60Q 1/085* (2013.01); *G06K 9/00818* (2013.01); *G06K 9/00825* (2013.01); *B60Q 2300/054* (2013.01); *B60Q 2300/056* (2013.01); *B60Q 2300/338* (2013.01); *B60Q 2300/45* (2013.01)

(58) Field of Classification Search
CPC ............ B60Q 1/04; B60Q 1/26; H04N 7/18
See application file for complete search history.

(56) References Cited

U.S. PATENT DOCUMENTS

| 7,415,338 B2 | 8/2008 | Monji et al. |
| 7,782,184 B2* | 8/2010 | Wittorf .................... B60Q 1/50 340/435 |
| 8,487,535 B2* | 7/2013 | Tani ..................... B60Q 1/1423 315/82 |

(Continued)

FOREIGN PATENT DOCUMENTS

| DE | 102007 034196 | 1/2009 |
| DE | 102009051485 | 6/2010 |

(Continued)

OTHER PUBLICATIONS

International Search Report for PCT/EP2012/053154, issued on May 22, 2012.

*Primary Examiner* — Thomas G Black
*Assistant Examiner* — Ana Thomas
(74) *Attorney, Agent, or Firm* — Norton Rose Fulbright US LLP

(57) ABSTRACT

A method for influencing a lighting scene ahead of a vehicle is described, the method including a step of reading in information regarding a position of at least one recognized object and regarding a class of the recognized object. Furthermore, the method includes a step of assigning a lighting area, related to the position of the object, having a lighting intensity related to the class of the object for the lighting area. The method also includes a step of adapting the lighting scene, taking into account the lighting area and the associated lighting intensity.

12 Claims, 4 Drawing Sheets

(56) References Cited

U.S. PATENT DOCUMENTS

| | | | | |
|---|---|---|---|---|
| 2008/0297374 | A1* | 12/2008 | Usami | B60Q 1/143 340/935 |
| 2009/0072996 | A1* | 3/2009 | Schoepp | B60Q 1/1423 340/903 |
| 2010/0188864 | A1* | 7/2010 | Raghunathan | B60Q 1/085 362/466 |
| 2010/0265330 | A1* | 10/2010 | Li | B60Q 1/143 348/148 |
| 2011/0012511 | A1 | 1/2011 | Watanabe | |
| 2015/0151669 | A1* | 6/2015 | Meisner | B60Q 1/085 701/49 |

FOREIGN PATENT DOCUMENTS

| | | | |
|---|---|---|---|
| EP | 1780462 | 5/2007 | |
| EP | 2127945 | 12/2009 | |
| EP | 2147823 | 1/2010 | |
| EP | 2275305 | 1/2011 | |
| WO | WO2013102526 | * 7/2013 | B60Q 1/08 |

* cited by examiner

METHOD AND CONTROL UNIT FOR INFLUENCING A LIGHTING SCENE AHEAD OF A VEHICLE

FIELD OF THE INVENTION

The present invention relates to a method for influencing a lighting scene ahead of a vehicle, to a corresponding control unit as well as to a corresponding computer program product.

In a conventional light control, a light distribution ahead of a vehicle may be switched over either manually or automatically between low-beam lights and high-beam lights, for example. In this way, a beam shape of the light emitted by the vehicle may be varied between different states. The low-beam lights illuminate an asymmetric area ahead of the vehicle. In the case of right-hand traffic, a right-hand edge of the illuminated area is brightened by the headlights over a larger distance ahead of the vehicle than a left-hand edge of the illuminated area. The emitted light is strongly focused and has a strongly pronounced bright/dark border at an edge of the light cone facing away from the road. The light cone emitted by high-beam lights is delimited less strongly. The light cone of the high-beam lights brightens a larger portion of a field of vision of the driver than the low-beam lights. To protect the oncoming traffic from being blinded, an angle of the light cones, in particular of the low-beam lights, may be adapted to a load situation of the vehicle. For this purpose, the height angle of the headlights or parts thereof may be adjusted manually or with the aid of a motor. This changes an illumination range of the low-beam lights. A side angle of some headlights is coupled to a steering angle of the vehicle in order to be able to use the headlights for lighting in a curve in the case of a steering angle. Here, the entire beam is swiveled.

German Published Patent Appln. No. 10 2007 034 196 discloses a method for lane detection having a driver assistance system of a vehicle including a sensor system for lane recognition in which measuring points, which represent lane markings, are detected with the aid of the sensor system for lane recognition in an area lying ahead of the vehicle. An ideal number of measuring points MP is ascertained on the basis of a reference model. A plausibility measure of the forward-looking range is determined based on a comparison between the number of the actually detected measuring points and the ideal number of measuring points.

SUMMARY

Against this background, a method for influencing a lighting scene ahead of a vehicle, furthermore a control unit for influencing a lighting scene ahead of a vehicle, which uses this method, as well as ultimately a corresponding computer program product according to the present invention.

The present invention is based on the finding that object recognition and object classification are increasingly used in vehicles to obtain information regarding vehicle surroundings. When a range of vision is illuminated ahead of the vehicle using adaptive headlights, the obtained information may be used to illuminate areas of recognized and classified objects as needed and depending on the class. For example, a lighting intensity by the headlights may be reduced in the areas around the objects classified as reflective in order to prevent the vehicle driver from being blinded by his own vehicle. Likewise, a lighting intensity by the headlights may be reduced in areas around the objects in question in order to prevent objects classified as "other traffic participants" from being blinded.

Advantageously, a high lighting level, which is adapted in a targeted manner for recognized and classified objects according to one class of an object, may be achieved across the entire range of vision. In this way, the vehicle driver's view may be improved and potential hazards may be perceived faster by the vehicle driver.

The present invention provides a method for influencing a lighting scene ahead of a vehicle, the method including a step of reading in information regarding a position of at least one recognized object and regarding a class of the recognized object. Furthermore, the method includes a step of assigning a lighting area, related to the position of the object, having a lighting intensity related to the class of the object for the lighting area. The method also includes a step of adapting the lighting scene, taking into account the lighting area and the associated lighting intensity.

The present invention furthermore provides a control unit for influencing a lighting scene ahead of a vehicle, the control unit or information system having a device for reading in information regarding a position of at least one recognized object and regarding a class of the recognized object. The control unit or information system also has a device for assigning a lighting area, related to the position of the object, having a lighting intensity related to the class of the object for the lighting area. Furthermore, the control unit or information system has a device for adapting the lighting scene, taking into account the lighting area and the associated lighting intensity.

A lighting scene may be understood to mean a setting, which is adapted to a driving situation or a vehicle location and stored, for a vehicle lighting system, in particular at least of a front headlight. Lighting scenes may be referred to by self-explanatory names such as high-beam lights or intersection lights, or curve lights. An object may be another vehicle, road equipment, an animal, a pedestrian, a cyclist, a pothole, or also fog, for example. A class may be a category assigned to an object due to one or multiple differentiation criteria. For example, categories in vehicles may be distinguished by a driver position or an estimated eye level of the driver above the roadway. For example, categories in the case of road equipment may be traffic signs, lane markings, directional signs, a guiding system, signaling, and lighting. The categories may also be subclassified. A lighting area may include one or multiple objects entirely or partially. The lighting area may also include a section or subarea of the object. For example, the lighting area of a traffic sign may include an information surface of the traffic sign and does not include a mounting of the sign. In a vehicle, the lighting area may, for example, include a ground surface around the vehicle and a subarea of the vehicle close to the ground. A lighting intensity may be understood to mean a light intensity per surface striking the lighting area.

According to another specific embodiment of the present invention, a size of the known object may be read in the step of reading in and the lighting area may be furthermore assigned, taking into account the size of the object, in the step of assigning. A size of an object may be understood to mean a projected expansion from a vehicle's perspective. By taking into account the size, it is possible to better adapt the lighting area to a shape of the object actually perceivable from the vehicle.

In another specific embodiment, a lighting period related to the class of the object may be assigned in the step of assigning, and the lighting scene may furthermore be adapted taking into account the lighting period in the step of adapting. A lighting period may be understood to mean a holding time after the object has changed. For example, as a response to the recognition of a wild animal ahead of the vehicle, in particular at the road edge, a spot where the animal has been recognized may be illuminated for a longer period of time than the period during which the animal is located at the spot, since another animal might appear at the same spot, for example. Or, a traffic sign is temporarily obscured, but is still located at the same spot. In this case, the spot may continue to be illuminated, although the traffic sign is not visible for the time being. Likewise, an attention span may be used as the lighting period when an illumination of an object is not necessary for passing the object with the vehicle. For example, highlighting directional signs, which are not related to a planned route for the vehicle, is reasonable for a short time period as orientation guide only. The driver's attention shall not be distracted from the actual driving task.

In one additional specific embodiment of the present invention, the course of a roadway recognized ahead of the vehicle may furthermore be read in the step of reading in, and a roadway lighting area and a roadway lighting intensity may be oriented toward the course of the roadway in the step of assigning, the roadway lighting intensity being, in particular, elevated for an edge area of the roadway lighting area compared to a basic lighting intensity of the lighting scene. The course of a roadway may be understood to mean a road section located ahead of the vehicle and to be traveled in the near future. The course of the roadway may be recognized by an evaluation of a guiding device and/or a lane marking, for example. A roadway lighting area may include the road section or parts thereof. Likewise, the roadway lighting area may include at least one adjacent edge area such as the roadway edge. A roadway lighting intensity may be a high light intensity, since the roadway is usually composed of a dark material and reflects little light. A basic lighting intensity may be a lighting intensity stored in the lighting scene for the particular area. The edge area may, in particular, be highlighted to be able to recognize hazards particularly early, for example. With the aid of advance roadway recognition and advance roadway lighting, it may, for example, be possible to illuminate a curve even if the vehicle has not yet reached the beginning of the curve.

According to another specific embodiment of the present invention, a lighting area having an adapted lighting intensity, in particular a reduced lighting intensity compared to a basic lighting intensity of the lighting scene, may be assigned in the step of assigning to the retroreflective object as a response to the recognition of a retroreflective object ahead of the vehicle. A retroreflective object may, for example, be understood to mean a reflector or a reflectively designed object such as a traffic sign. Likewise, it may be understood to mean a reflective object having accidental reflectivity, e.g., a window surface oriented orthogonally toward incident light. Due to a large light emission or a high lighting intensity of powerful headlights, there is great blinding potential for the host vehicle if the retroreflective object is illuminated with full light intensity. This may significantly interfere with the dark adaptation of the driver. By lighting, for example, traffic signs and road signs with a light intensity which is adapted to the surrounding conditions, especially a surrounding brightness, it may be ensured that the driver recognizes the signs, without being blinded. It is thus possible in the case of increasing darkness for the lighting intensity for the object to be reduced accordingly in order to achieve a constant brightness contrast against the background.

Furthermore, a lighting area having an adapted lighting intensity, in particular a reduced lighting intensity compared to a basic lighting intensity of the lighting scene, may also be assigned to the passing vehicle in the step of assigning as a response to the recognition of a passing vehicle. A passing vehicle may be understood to mean a vehicle which passes the host vehicle at a (for example, positive) difference velocity. If the passing vehicle and its driver are illuminated by the light cone of the high-beam lights, for example, the driver of the passing vehicle is severely blinded. To prevent this from happening, the vehicle and the surfaces which guide the light cone directly to the vehicle and the driver may be illuminated less intensely. This may also result in that the cast shadow of the passing vehicle is less pronounced, thus preventing another irritation of the driver of the passing vehicle. Areas which are not affected by that may continue to be illuminated at the basic lighting intensity.

In one additional specific embodiment of the present invention, as a response to the recognition of a vehicle having a high driver position, a lighting area having an adapted bright/dark border, in particular an elevated bright/dark border compared to a bright/dark border of the lighting scene (for example, spatially) may be assigned to the vehicle having the high driver position in the step of assigning, and/or, as a response to the recognition of a vehicle having a low driver position, a lighting area having an adapted bright/dark border, in particular a bright/dark border lowered compared to a bright/dark border of the lighting scene (for example, spatially) may be assigned to the vehicle having the low driver position in the step of assigning. A vehicle having a high driver position may have a driver seat having a great distance from the roadway; a vehicle having a low driver position may have a driver seat having a small distance from the roadway. For example, a vehicle having a high driver position may be a truck or a bus. A vehicle having a low driver position may, for example, be a sports car, a motorbike, or a recumbent bicycle. A bright/dark border may be understood as a shadow border. The bright/dark border separates an area illuminated by a light source or the light cone from an area which is directly adjacent to the light source, but is not illuminated by the light source. In the considered case, the bright/dark border is to be understood as the upper border facing away from the roadway between a headlight beam and an area which is not illuminated by the headlight beam. For example, a truck may be illuminated by a higher bright/dark border, without blinding the driver, than a passenger car or a limousine. The passenger car or the limousine may be illuminated by a higher bright/dark border, without blinding the driver, than a motorbike or a recumbent bicycle.

Furthermore, the present invention provides a control unit which is designed to carry out or implement the steps of the method according to the present invention in appropriate devices. This embodiment variant of the present invention in the form of a control unit also makes it possible to achieve the object underlying the present invention rapidly and efficiently.

In the present case, a control unit may be understood as an electric device which processes sensor signals and outputs control signals as a function thereof. The control unit may have an interface which may be implemented in hard- and/or software. In the case of hardware, the interfaces may, for example, be a part of a so-called system ASIC, which includes various functions of the control unit. It is, however, also possible that the interfaces are independent, integrated circuits or are at least partially made of discrete components. In the case of software, the interfaces may be software modules which are present on a microcontroller in addition to other software modules, for example.

A computer program product having program code is also advantageous, which may be stored on a machine-readable carrier, such as a semiconductor memory, a hard disk memory, or an optical memory, and is used for carrying out the method according to one of the specific embodiments described above, when the program is executed on a device corresponding to a computer.

DETAILED DESCRIPTION

Figure 1:
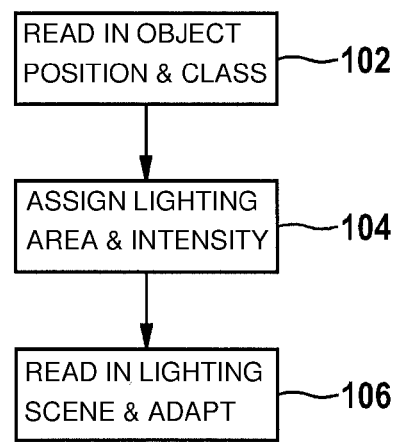
FIG. 1 shows a flow chart of a method for influencing a lighting scene ahead of a vehicle according to one exemplary embodiment of the present invention.

In the following description of advantageous exemplary embodiments of the present invention, the elements which are illustrated in the various figures and appear to be similar are identified with identical or similar reference numerals; a repetitive description of these elements is dispensed with.

FIG. 1 shows a flow chart of a method for influencing a lighting scene ahead of a vehicle according to one exemplary embodiment of the present invention. The method has a step 102 of reading in, a step 104 of assigning, as well as a step 106 of adapting. In step 102, information is read in regarding a position and a class of a recognized object ahead of the vehicle. The information may be delivered by a camera-based recognition system. The information may also be delivered by another object recognition system. In step 104, the recognized object(s) is/are assigned one lighting area and one lighting intensity each. The lighting area is assigned as a function of the position of the object. The lighting intensity of the lighting area is assigned as a function of the class of the object in the lighting area. The lighting area may be limited to one subarea of the object. The lighting intensity may be assigned, as a function of a comparison, to the setpoint lighting intensity established for the class. In step 106, the lighting scene is supplemented with or changed by the previously assigned lighting areas and lighting intensities, and a luminous flux is increased or reduced in the lighting areas compared to a basic luminous flux of the lighting scene.

Figure 2:
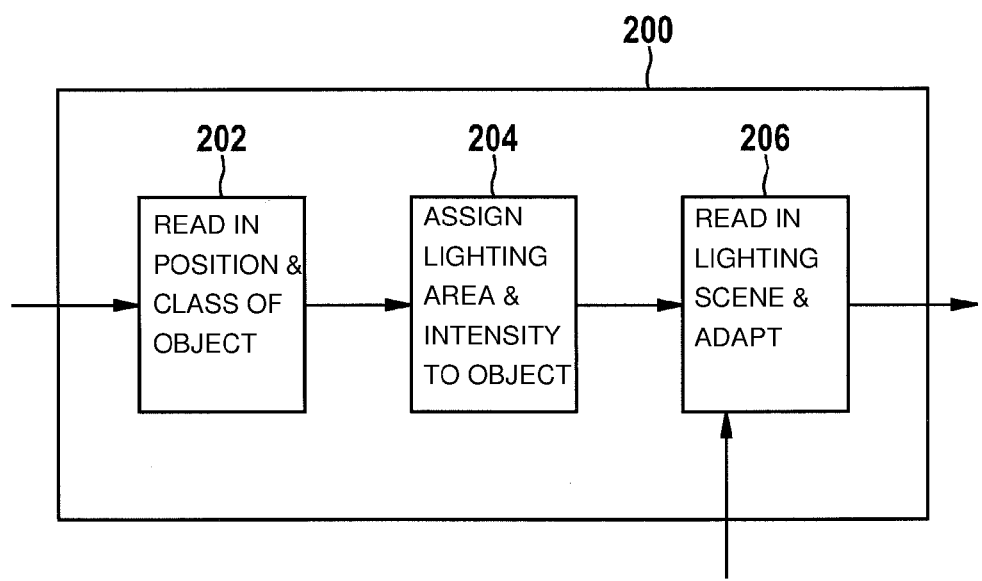
FIG. 2 shows a block diagram of a control unit for influencing a lighting scene ahead of a vehicle according to one exemplary embodiment of the present invention.

FIG. 2 shows a block diagram of a control unit for influencing a lighting scene ahead of a vehicle according to one exemplary embodiment of the present invention. Control unit 200 has a device for reading in 202, a device for assigning 204, as well as a device for adapting 206. Device 202 for reading in reads in information regarding a position and a class of a recognized object ahead of the vehicle. Device 204 for assigning assigns to the recognized object(s) one lighting area and one lighting intensity each. The lighting area is assigned as a function of the position of the object. The lighting intensity of the lighting area is assigned as a function of the class of the object in the lighting area. Device 206 for adapting reads in a lighting scene and adapts the lighting scene using the previously assigned lighting area(s) and lighting intensity(ies). The adapted lighting scene is output.

Figure 3:
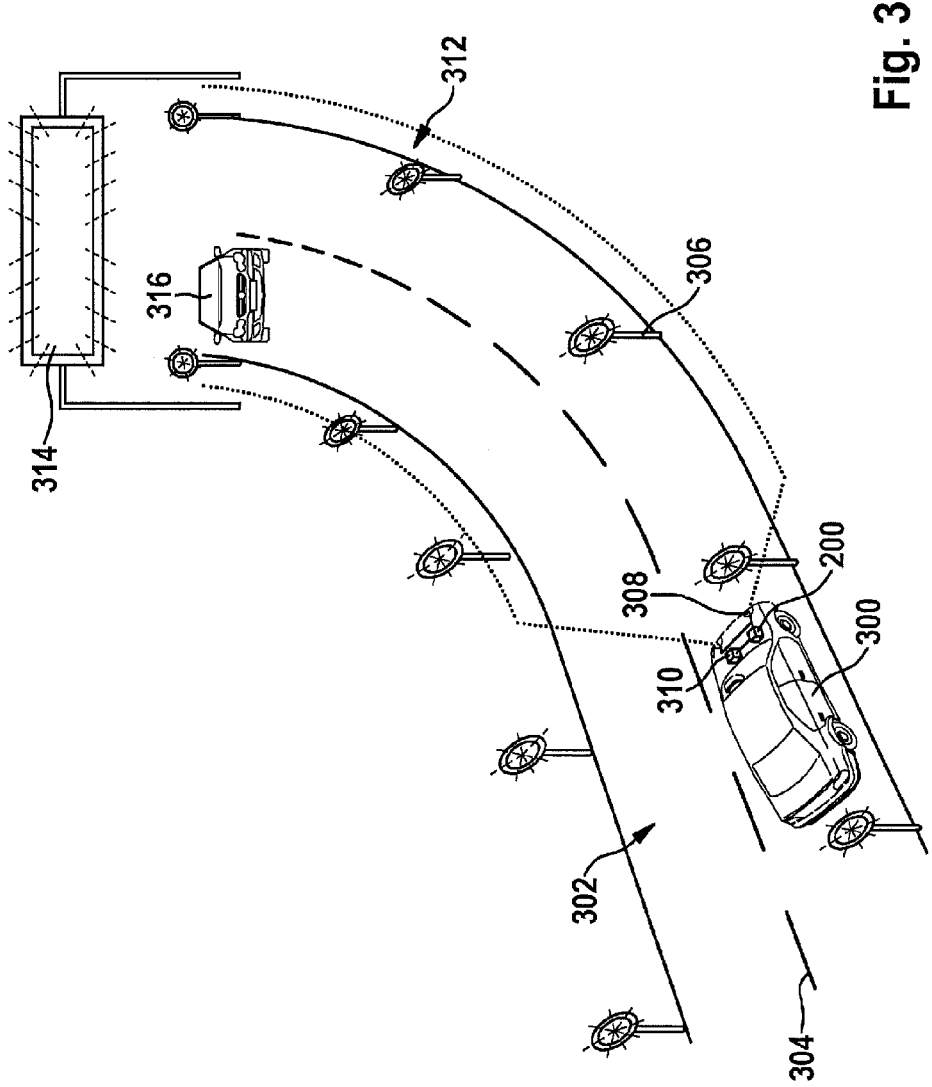
FIG. 3 shows an illustration of multiple examples of influencing a lighting scene ahead of a vehicle according to exemplary embodiments of the present invention.

FIG. 3 shows an illustration of multiple examples of influencing a lighting scene ahead of a vehicle according to exemplary embodiments of the present invention. A vehicle 300 drives on a road 302. Road 302 has a straight section in the area where vehicle 300 is located. Road 302 has a left turn in the driving direction of vehicle 300 after the straight section. Road 302 has a roadway marking 304 and guiding devices 306. Roadway marking 304 is implemented as a broken line in the center of road 302. Guiding devices 306 are implemented as guide posts 306 having reflectors and are situated in pairs at regular intervals on the left and on the right of road 302. Vehicle 300 has a control unit 200 for influencing a lighting scene ahead of a vehicle and two adaptive headlights 308. Vehicle 300 detects at least one of the vehicle surroundings ahead of vehicle 300 with the aid of a detection device 310. Detection device 310 recognizes a position of objects in the vehicle surroundings and classifies the objects into stored categories. Control unit 200 may access the positions and categories of the recognized objects. Detection device 310 furthermore detects the course of a road ahead of vehicle 300. Control unit 200 may also access the detected course of the road. Based on the course of the road, control unit 200 assigns a roadway lighting area 312 and a roadway lighting intensity to road 302 ahead of the vehicle. Roadway lighting area 312 includes the course of the road ahead of vehicle 300 and an edge area on both sides. This results in roadway lighting area 312 having a bent shape according to the left turn of road 302. Control unit 200 adapts a lighting scene, which is due to the driving situation and which has roadway lighting area 312, and the associated roadway lighting intensity. Here, the edge area, in particular, in which guide posts 306 are located, is illuminated brighter so that hazardous situations may be recognized faster. As a result, the reflectors reflect light of headlights 308 from guide posts 306 back to vehicle 300 in an amplified manner. If the reflected light exceeds a predetermined threshold value which depends on the brightness of the surroundings, control unit 200 reduces the illumination of guide posts 306 until the threshold value is no longer exceeded. The guide posts may thus be regarded as a lighting area for which the lighting intensity is adapted, in particular reduced. At the end of the left turn, there is a large reflective sign 314 in the form of a sign gantry. Since roadway lighting area 312 already includes sign 314, a lot of light is reflected from sign 314 toward vehicle 300. Here, too, control unit 200 reduces the amount of light in an area in which the sign is located until the threshold value is no longer exceeded in this area in order to reduce or prevent blinding. In the left turn, there is an oncoming vehicle 316 and it is already included in roadway lighting area 312, so that headlights 308 illuminate vehicle 316. Due to the classification of vehicles 316 into a category, such as a passenger car or a truck, a bright/dark border is adapted in control unit 200 in an area around vehicle 316 in such a way that the driver of vehicle 316 is no longer blinded by headlights 308 or blinded only to an acceptable extent. Here, a height of the bright/dark border is assigned according to a stored seating height of the category of vehicle 316 above roadway 302.

Figure 4:
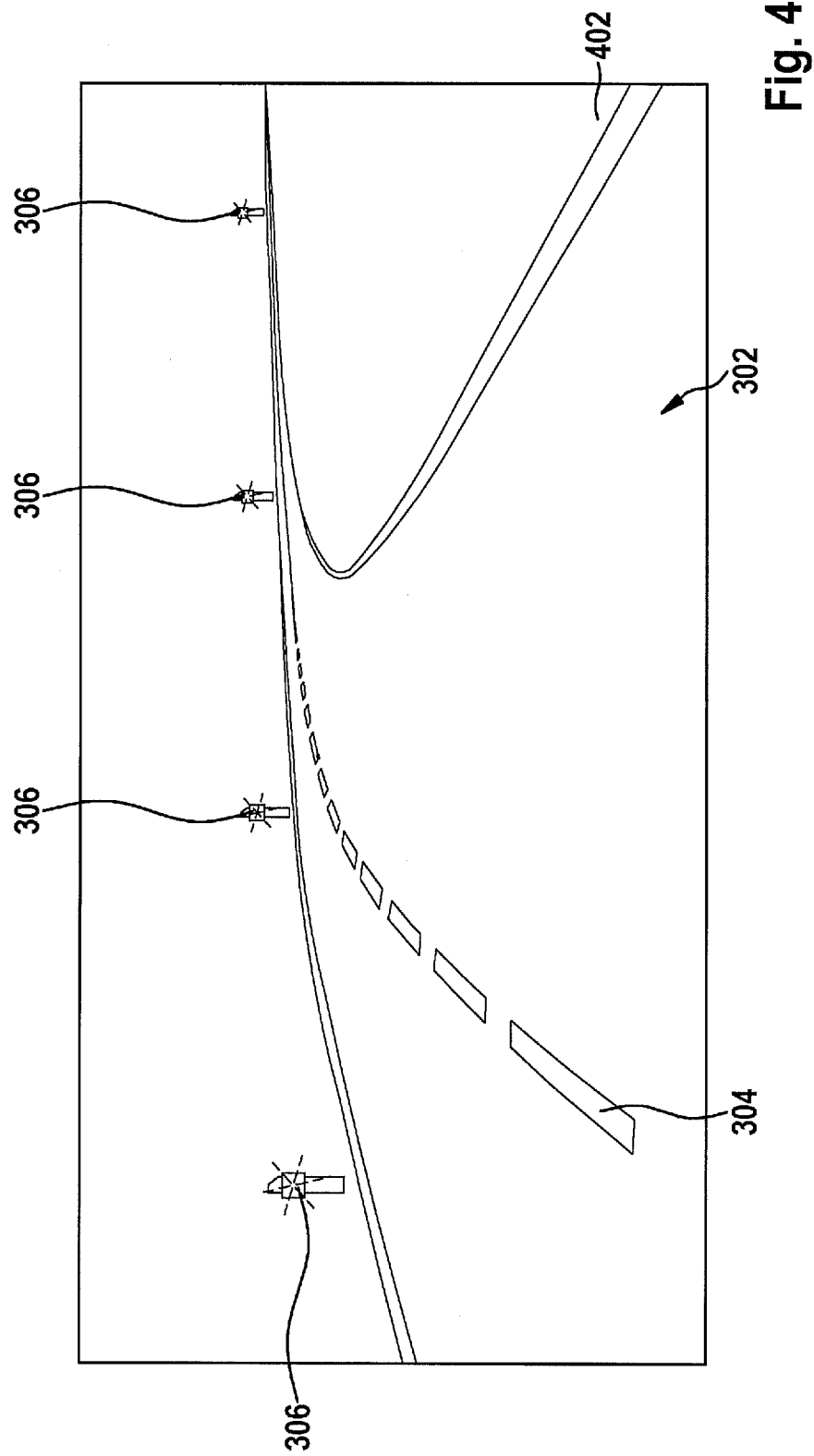
FIG. 4 shows an illustration of an adaptation of a lighting scene ahead of a vehicle by a method according to one exemplary embodiment of the present invention.
Figure 5:
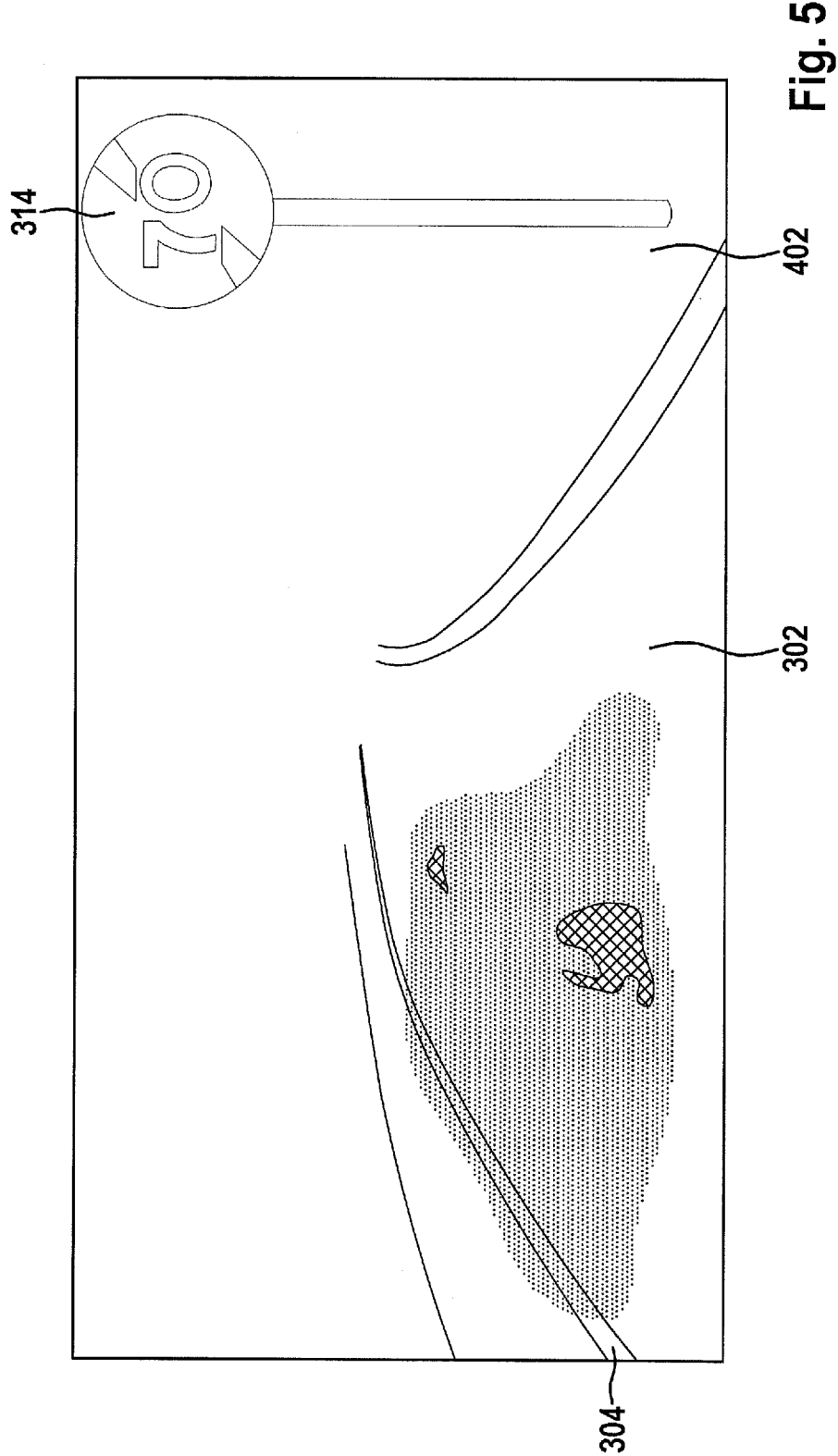
FIG. 5 shows another illustration of an adaptation of another lighting scene ahead of a vehicle by a method according to one exemplary embodiment of the present invention.

FIGS. 4 and 5 show illustrations of adaptations of a lighting scene ahead of a vehicle by a method according to one exemplary embodiment of the present invention. A characteristic-based light control is shown which builds on a light control on the basis of an estimated vertical and horizontal angle and/or an angle range of a regulation-relevant object or on the basis of an estimated distance. For a video-based light control in the vehicle, it is of interest, in addition to the above-mentioned characteristics, to know more about the type of the detected light objects or objects ahead of the vehicle. In this way, it is possible in special situations, such as in the case of road lighting, traffic signs, etc., or in the case of defined vehicle categories, such as passenger cars, trucks, motorcycles, bicycles, etc., to optimize the light control accordingly. As a criterion to be optimized, not only should the light distribution itself be understood, but also, for example, possible positive and negative debounce times and/or the vertical adjustment angle or horizontal swivel angle to be set, in particular, in the subareas of the lighting scene to be illuminated. The information regarding the concrete type of a classified object, particularly of the classified infrastructure, may be utilized when using headlights or headlight modules, e.g., LED segments, which are advantageously separately controllable, in order to ensure a situational, optimal illumination of the roadway including the infrastructure.

By utilizing this additional information, it is, for example, possible to deliberately illuminate traffic signs and/or road signs or to inhibit or reduce the active illumination based on additional characteristics, preferably such as the size of the sign or an estimated reflectivity, in order to prevent the driver of the host vehicle from being blinded. After passing a corresponding sign, for example, the full illumination may be used again without a debouncing time.

It is accordingly also possible, in the case of a classified truck headlight pair, to preferably set the bright/dark edge higher for a sliding lighting range control and to use a larger adjustment angle than in the case of a passenger car, whereby the area around the truck is illuminated better for the driver of the vehicle, without blinding the driver of the truck, thus achieving a greater range of the headlights.

If a passing vehicle is classified, it is, for example, possible to implement an optimized turning off or change of the illumination characteristic when using headlights which are advantageously controllable separately. As a result, the illumination of the area, in which glare suppression is not absolutely necessary, may be ensured for the longest time possible for both the driver and the driver of the passing vehicle.

If guide posts are classified, the light distribution may be set in such a way that only the roadway area, including the edge area, is illuminated, whereby persons at the roadway edge or bicyclists are not blinded, for example. On the basis of the guide posts, it is possible to activate an intelligent "advance" dynamic curve light in which case the vehicle has not entered a curve yet, for example, but the headlights of the vehicle are able to be swiveled to follow the course of the road.

Possible classification categories or distinctive characteristics for the above-mentioned light objects are, for example, a singular headlight and/or a rear light, a headlight pair and/or a rear light pair of a passenger car, a headlight pair and/or a rear light pair of a truck, a passing vehicle, the position lights of a vehicle, road lights or road lighting, traffic signs or size message signs, guide posts, ground reflection, reflections from guardrails, and the like.

FIG. 4 shows reflective guide posts 306 which mark the curved course of the road. A road 302 ahead of a vehicle runs in a right turn. A lighting intensity becomes smaller as the distance ahead of the vehicle increases. A road marking 304 is no longer recognizable between second guide post 306 and third guide post 306. A right-hand soft shoulder 402 is no longer recognizable already at first guide post 306. To better illuminate road 302, a roadway lighting area is defined along reflective guide posts 306 and equipped with a roadway lighting intensity as a characteristic. Subsequently, the headlights of the vehicle are influenced in such a way that the roadway lighting area is illuminated. As a result, road 302 is visible for a driver of the vehicle farther ahead of the vehicle. This light control takes place independently of steering commands of the driver and/or acting transverse accelerations. The roadway lighting area is configured based on the course of a roadway recognized ahead of the vehicle.

FIG. 5 also shows a road 402 having roadway marking 304. Road 402 runs in a right turn ahead of the vehicle and is illuminated less with increasing distance ahead of the vehicle. A traffic sign 314 is recognizable at the right-hand roadway edge. The light control of the vehicle prevents an illumination of traffic sign 314 at full light intensity in order to reduce or prevent blinding of the driver. A close range ahead of the vehicle is illuminated more strongly due to damage of road 302. The light control thus has responded to a hazard class of the roadway damage and highlights the damage by a high lighting intensity. A right-hand soft shoulder 402 is, however, recognized as not dangerous and is illuminated only at a basic light intensity.

The exemplary embodiments described and shown in the figures have only been selected as examples. Different exemplary embodiments may be combined with each other in their entirety or with regard to their individual features. Also, one exemplary embodiment may be supplemented with features of another exemplary embodiment.

Furthermore, method steps according to the present invention may be repeated and executed in a sequence different from the one described.

If an exemplary embodiment includes an "and/or" link between a first characteristic and a second characteristic, this may be read in such a way that the exemplary embodiment according to one specific embodiment has both the first characteristic and the second characteristic and according to another specific embodiment it has either only the first characteristic or only the second characteristic.

What is claimed is:

1. A method for influencing a lighting scene ahead of a vehicle, the method comprising:
   reading in information regarding a position of at least one recognized object and regarding a class of the recognized object;
   assigning a lighting area, related to the position of the object, having a lighting intensity related to the class of the object for the lighting area; and
   adapting the lighting scene, taking into account the lighting area and the associated lighting intensity;
   wherein the assigning includes assigning a lighting period related to the class of the object,
   wherein the adapting includes adapting the lighting scene by taking into account the lighting period, and
   wherein the lighting period means a duration of an illumination of the object.

2. The method as recited in claim 1, wherein:
the step of reading in includes reading in a size of the object, and
the assigning step includes assigning the lighting area by taking into account the size of the object.

3. The method as recited in claim 2, wherein:
the assigning step includes assigning the lighting area having an adapted lighting intensity to a passing vehicle as a response to a recognition of the passing vehicle.

4. The method as recited in claim 3, wherein the adapted light intensity includes a reduced lighting intensity compared to a basic lighting intensity of the lighting scene.

5. The method as recited in claim 2, wherein at least one of the following is satisfied:
as a response to a recognition of a vehicle having a high driver position, the assigning step includes assigning the lighting area having an adapted bright/dark border to the vehicle having the high driver position, and
as a response to a recognition of a vehicle having a low driver position, the assigning step includes assigning the lighting area having the adapted bright/dark border to the vehicle having the low driver position.

6. The method as recited in claim 5, wherein the adapted bright/dark border includes an elevated bright/dark border compared to a bright/dark border of the lighting area.

7. The method as recited in claim 5, wherein the adapted bright/dark border includes a lowered bright/dark border compared to a bright/dark border of the lighting area.

8. The method as recited in claim 1, wherein:
the step of reading includes reading in a course of a roadway recognized ahead of the vehicle, and
the step of assigning includes orienting a roadway lighting area and a roadway lighting intensity toward the course of the roadway, the roadway lighting intensity being elevated for an edge area of the roadway lighting area compared to a basic lighting intensity of the lighting scene.

9. The method as recited in claim 1, wherein:
the step of assigning includes assigning the lighting area having an adapted lighting intensity to a retroreflective object as a response to a recognition of the retroreflective object ahead of the vehicle.

10. The method as recited in claim 9, wherein the adapted lighting intensity includes a reduced lighting intensity compared to a basic lighting intensity of the lighting scene.

11. A control unit for influencing a lighting scene ahead of a vehicle, comprising:
a device for reading in information regarding a position of at least one recognized object and regarding a class of the recognized object;
a device for assigning a lighting area, related to the position of the object, having a lighting intensity related to the class of the object for the lighting area; and
a device for adapting the lighting scene, taking into account the lighting area and the associated lighting intensity;
wherein the assigning includes assigning a lighting period related to the class of the object,
wherein the adapting includes adapting the lighting scene by taking into account the lighting period, and
wherein the lighting period means a duration of an illumination of the object.

12. A computer readable medium having a computer program product having program code, which is executable by a control unit, comprising:
a program code arrangement having program code for influencing a lighting scene ahead of a vehicle, by performing the following:
reading in information regarding a position of at least one recognized object and regarding a class of the recognized object;
assigning a lighting area, related to the position of the object, having a lighting intensity related to the class of the object for the lighting area; and
adapting the lighting scene, taking into account the lighting area and the associated lighting intensity;
wherein the assigning includes assigning a lighting period related to the class of the object,
wherein the adapting includes adapting the lighting scene by taking into account the lighting period, and
wherein the lighting period means a duration of an illumination of the object.

* * * * *